US012781774B2

(12) United States Patent
Hishinuma et al.

(10) Patent No.: US 12,781,774 B2
(45) Date of Patent: Nov. 3, 2026

(54) HYDRAULIC VALVE APPARATUS

(71) Applicant: Komatsu Ltd., Tokyo (JP)

(72) Inventors: Yuichi Hishinuma, Tokyo (JP); Yuusuke Miyamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 162 days.

(21) Appl. No.: 18/863,236

(22) PCT Filed: May 16, 2023

(86) PCT No.: PCT/JP2023/018337
§ 371 (c)(1),
(2) Date: Nov. 5, 2024

(87) PCT Pub. No.: WO2024/009620
PCT Pub. Date: Jan. 11, 2024

(65) Prior Publication Data

US 2026/0185545 A1 Jul. 2, 2026

(30) Foreign Application Priority Data

Jul. 8, 2022 (JP) ................................ 2022-110490

(51) Int. Cl.
*F15B 13/08* (2006.01)
*F15B 13/06* (2006.01)

(52) U.S. Cl.
CPC .......... *F15B 13/0842* (2013.01); *F15B 13/06* (2013.01); *F15B 13/0871* (2013.01)

(58) Field of Classification Search
CPC ...... F15B 11/17; F15B 13/06; F15B 13/0807; F15B 13/0814; F15B 13/0842; F15B 13/0871
See application file for complete search history.

(56) References Cited

U.S. PATENT DOCUMENTS 3,146,593 A * 9/1964 Stacey .................... F15B 11/17
91/509
3,806,088 A * 4/1974 Stoneman ........... F15B 13/0821
137/884

(Continued)

FOREIGN PATENT DOCUMENTS

EP 3037676 A1 6/2016
JP S62-94158 U1 6/1987

(Continued)

*Primary Examiner* — Michael Leslie
(74) *Attorney, Agent, or Firm* — Troutman Pepper Locke LLP

(57) ABSTRACT

A hydraulic valve apparatus interposed between a hydraulic device and a hydraulic pump and controls supply of oil from the hydraulic pump to the hydraulic device by operating a spool provided in a valve body, in which the valve body includes two pump oil passages connected to separate hydraulic pumps via pump ports, and a plurality of linear motion spools separately provided corresponding to a plurality of linear motion hydraulic devices, the two pump oil passages are provided in the valve body to be arranged side by side along a same direction, the plurality of linear motion spools are connected to a portion located on one side of the pump port in the pump oil passages, and the two pump oil passages are connected to each other via a merging-separating oil passage including a merging-separating switching valve at an end portion located on one side of the pump port.

4 Claims, 17 Drawing Sheets

(56) References Cited

U.S. PATENT DOCUMENTS

| | | | | |
|---|---|---|---|---|
| 5,040,565 | A * | 8/1991 | Karakama | F15B 13/0842 137/884 |
| 5,046,400 | A * | 9/1991 | Karakama | F15B 13/0896 137/596.2 |
| 5,056,415 | A * | 10/1991 | Karakama | F15B 13/0842 91/461 |
| 5,533,334 | A | 7/1996 | Takeuchi et al. | |
| 5,651,390 | A | 7/1997 | Ishihama et al. | |
| 5,970,709 | A * | 10/1999 | Tohji | E02F 9/2292 60/429 |
| 9,494,171 | B2 * | 11/2016 | Kobayashi | F15B 13/024 |
| 10,017,917 | B2 * | 7/2018 | Kawaguchi | E02F 9/2296 |
| 10,215,198 | B2 * | 2/2019 | Takahashi | E02F 9/2228 |
| 10,718,100 | B2 * | 7/2020 | Brandt | E02F 9/2292 |
| 11,603,645 | B2 * | 3/2023 | Kim | E02F 9/2292 |
| 11,828,305 | B2 * | 11/2023 | Aoki | F15B 13/0821 |
| 2004/0154674 | A1 | 8/2004 | Pieper | |
| 2019/0194908 | A1 | 6/2019 | Ogura et al. | |
| 2025/0327276 | A1 * | 10/2025 | Hishinuma | F15B 11/22 |

FOREIGN PATENT DOCUMENTS

| | | | | |
|---|---|---|---|---|
| JP | H03-140678 | A | 6/1991 | |
| JP | H04-136511 | A | 5/1992 | |
| JP | H04-203033 | A | 7/1992 | |
| JP | H06-43301 | U | 6/1994 | |
| JP | 2571231 | Y2 | 5/1998 | |
| JP | 2002-181008 | A | 6/2002 | |
| JP | 2004-239427 | A | 8/2004 | |
| JP | 2009-41711 | A | 2/2009 | |
| JP | 2013-148175 | A | 8/2013 | |
| JP | 2015-40575 | A | 3/2015 | |
| JP | 2018-172860 | A | 11/2018 | |
| JP | 2019-183972 | A | 10/2019 | |
| WO | WO-2025069162 | A1 * | 4/2025 | F15B 13/0842 |
| WO | WO-2025069163 | A1 * | 4/2025 | E02F 9/22 |
| WO | WO-2025069166 | A1 * | 4/2025 | F16K 11/07 |

* cited by examiner

HYDRAULIC VALVE APPARATUS

FIELD

The present disclosure relates to a hydraulic valve apparatus, and particularly to a hydraulic valve apparatus in which a plurality of linear motion spools corresponding to a linear motion hydraulic device such as a hydraulic cylinder is provided in a valve body.

BACKGROUND

In a hydraulic valve apparatus that controls supply of oil to a plurality of hydraulic cylinders, two pump oil passages are provided in a valve body, and each of the pump oil passages is connected to a hydraulic pump via a pump port. A linear motion spool for controlling supply of oil to the hydraulic cylinder is connected to each pump oil passage. A merging-separating switching valve is provided between the two pump oil passages. Such type of hydraulic valve apparatus has an advantage that oil supplied to one pump port and oil supplied to the other pump port can be merged and supplied to the hydraulic cylinder by connecting the two pump oil passages by the merging-separating switching valve (for example, refer to Patent Literature 1).

CITATION LIST

Patent Literature

Patent Literature 1: Japanese Laid-open Patent Publication No. H03-140678 (Second drawing)

SUMMARY

Technical Problem

However, in the above-described hydraulic valve apparatus, oil having a large flow rate from the two hydraulic pumps that passed through the merging-separating switching valve passes through a portion of the pump oil passage to which the other linear motion spool is connected. Therefore, there is still room for improvement considering the pressure loss until oil is supplied to the target linear motion spool.

In view of the above circumstances, an object of the present disclosure is to provide a hydraulic valve apparatus capable of efficiently supplying a large amount of oil to a linear motion spool.

Solution to Problem

To attain the above object, according to the present disclosure, a hydraulic valve apparatus is interposed between a hydraulic device and a hydraulic pump and controls supply of oil from the hydraulic pump to the hydraulic device by operating a spool provided in a valve body. Further, the valve body includes two pump oil passages connected to separate hydraulic pumps via pump ports, and a plurality of linear motion spools separately provided corresponding to a plurality of linear motion hydraulic devices, the two pump oil passages are provided in the valve body to be arranged side by side along a same direction, the plurality of linear motion spools are connected to a portion located on one side of the pump port in the pump oil passages, and the two pump oil passages are connected to each other via a merging-separating oil passage including a merging-separating switching valve at an end portion located on one side of the pump port.

Advantageous Effects of Invention

According to the present disclosure, since oil that passed through the merging-separating switching valve does not merge with oil supplied from another hydraulic pump before reaching the target linear motion spool and the flow rate of oil passing through the pump oil passage is reduced, it is possible to efficiently supply a large amount of oil to the target linear motion spool while minimizing pressure loss.

DESCRIPTION OF EMBODIMENTS

Figure 1:
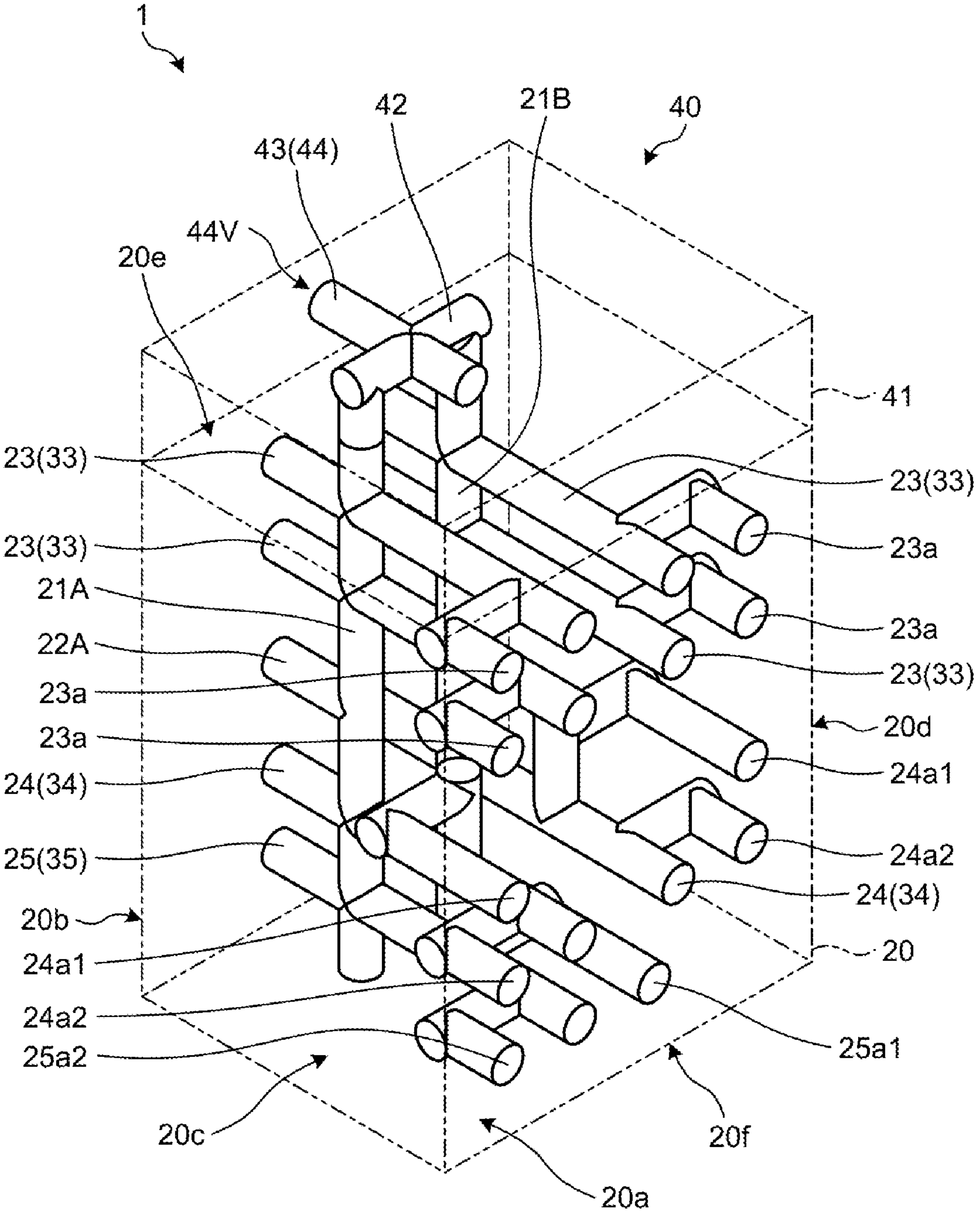
FIG. 1 is a perspective view conceptually illustrating the inside of a hydraulic valve apparatus according to an embodiment of the present disclosure.
Figure 2:
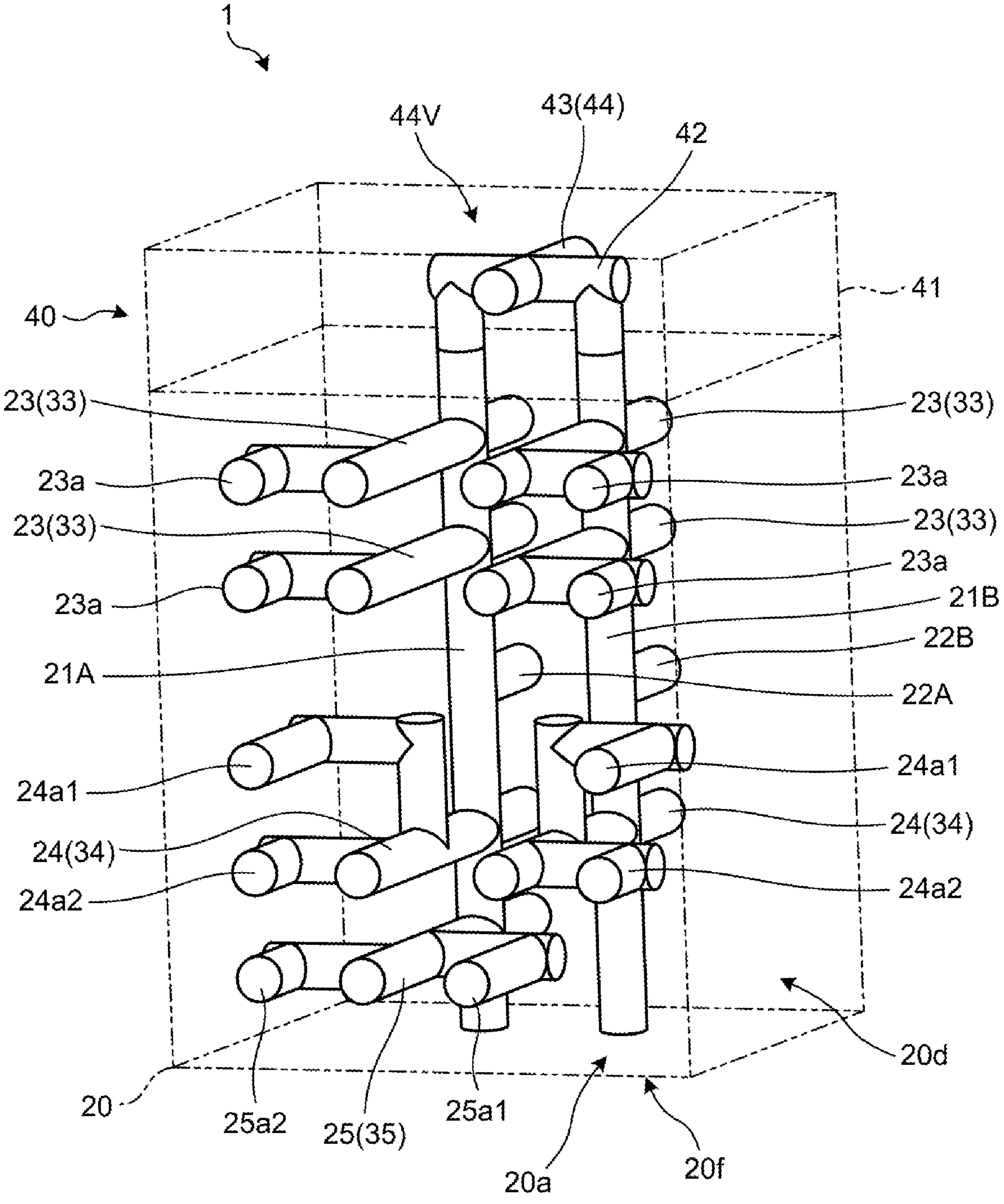
FIG. 2 is a perspective view conceptually illustrating the inside of the hydraulic valve apparatus illustrated in FIG. 1 from another angle.
Figure 3A:
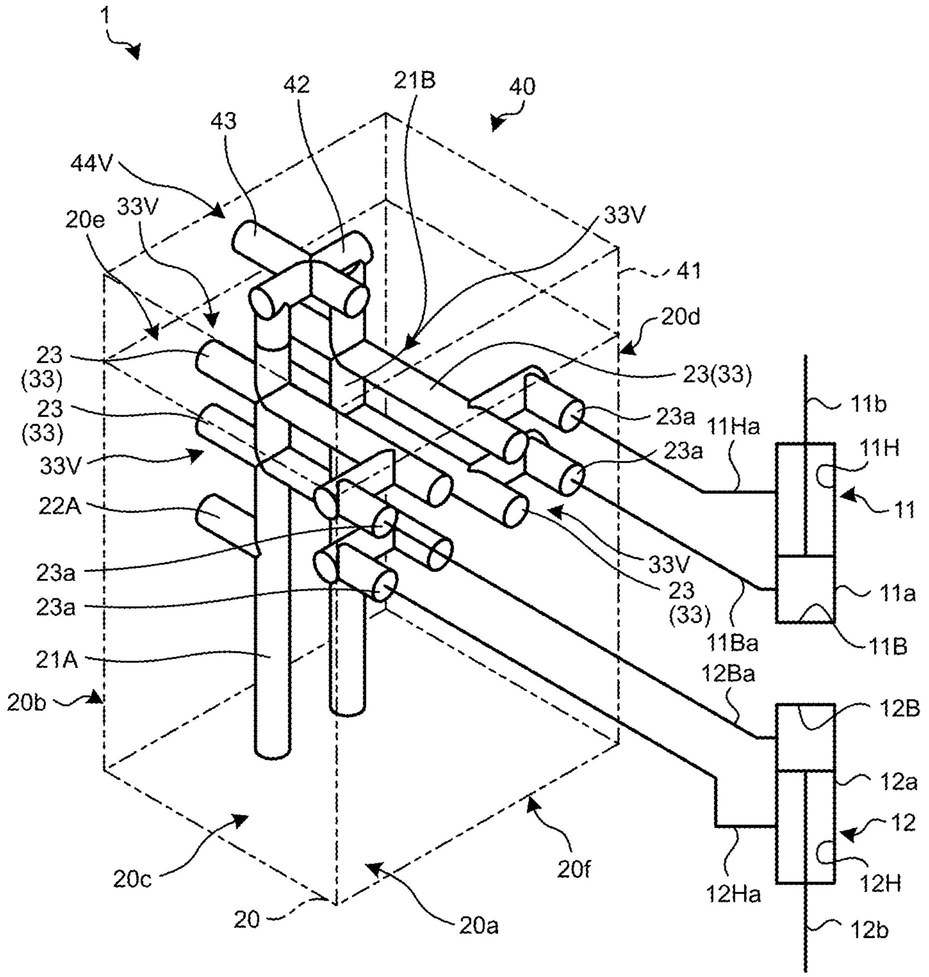
FIG. 3A is a perspective view corresponding to FIG. 1, illustrating only a configuration of a working equipment spool in the hydraulic valve apparatus illustrated in FIG. 1.
Figure 3B:
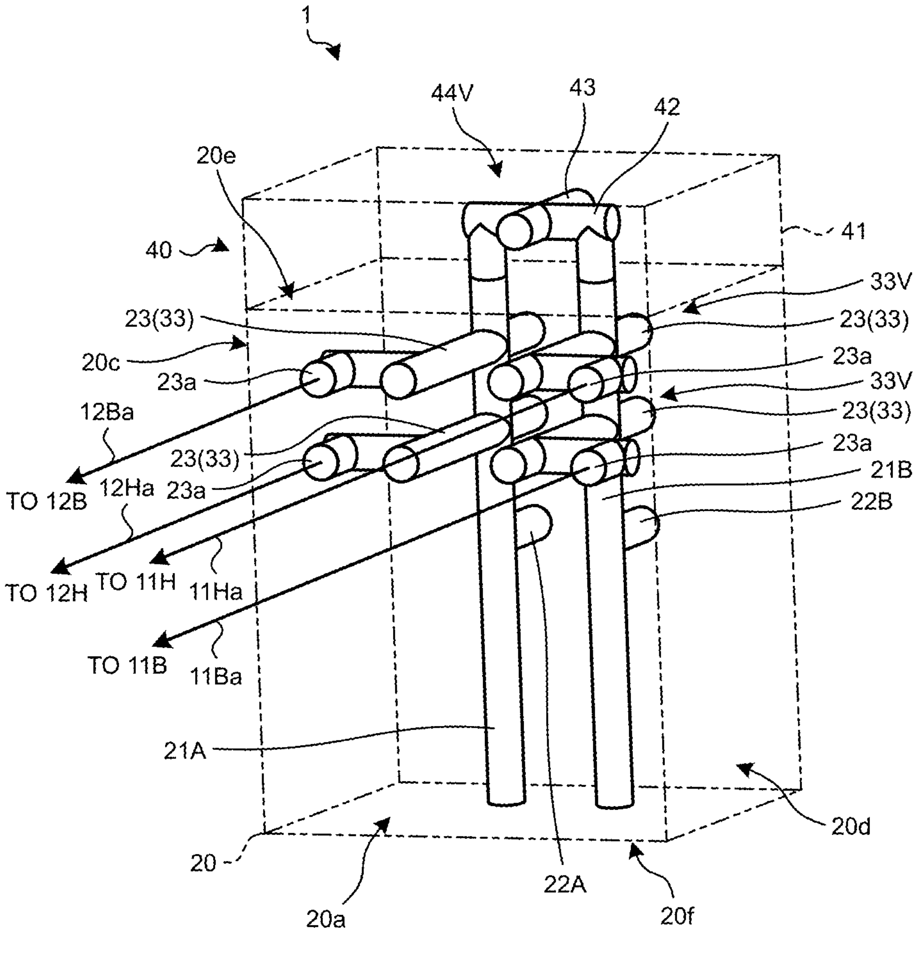
FIG. 3B is a perspective view corresponding to FIG. 2, illustrating only the configuration of the working equipment spool in the hydraulic valve apparatus illustrated in FIG. 1.
Figure 4A:
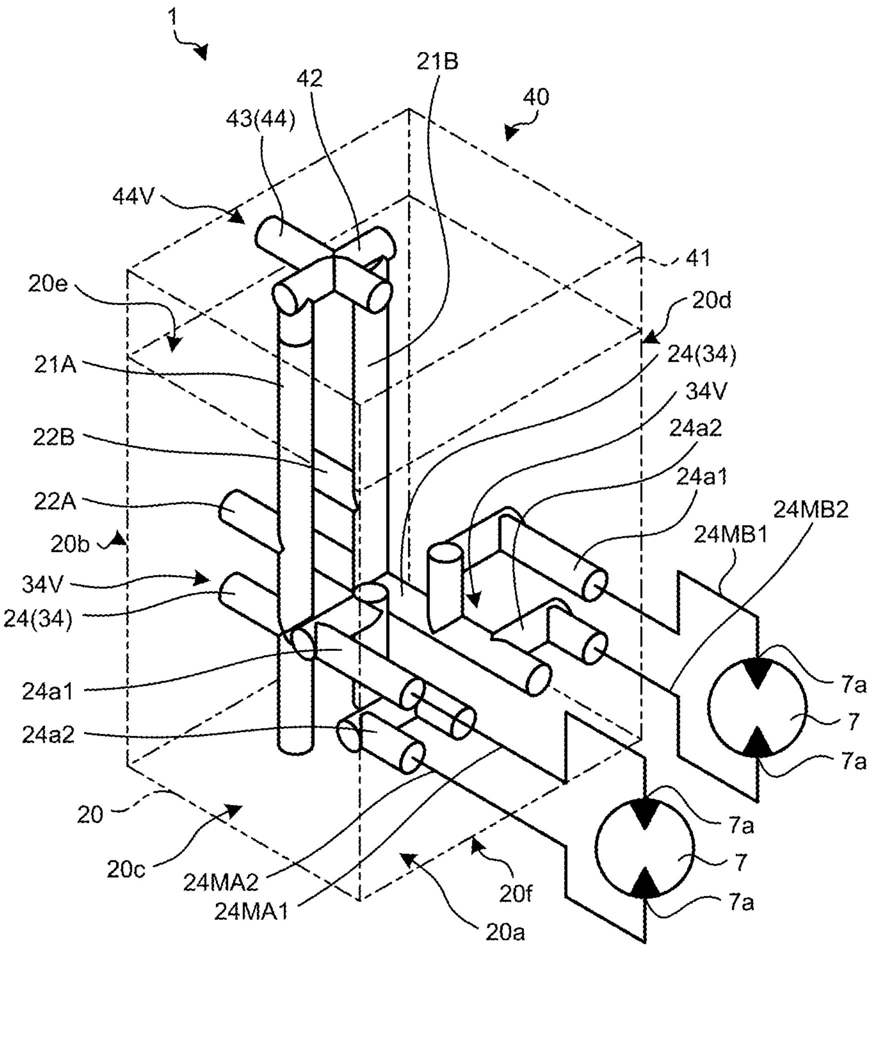
FIG. 4A is a perspective view corresponding to FIG. 1, illustrating only a configuration of a traveling spool in the hydraulic valve apparatus illustrated in FIG. 1.
Figure 4B:
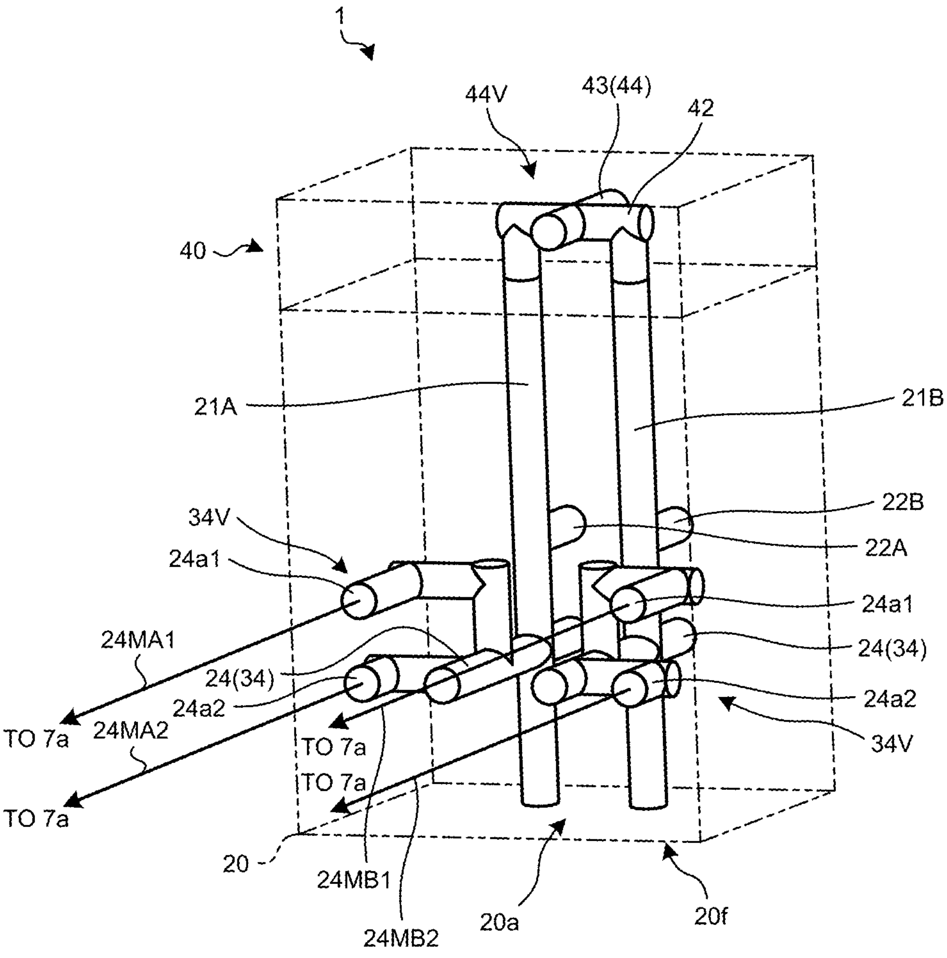
FIG. 4B is a perspective view corresponding to FIG. 2, illustrating only the configuration of the traveling spool in the hydraulic valve apparatus illustrated in FIG. 1.
Figure 5A:
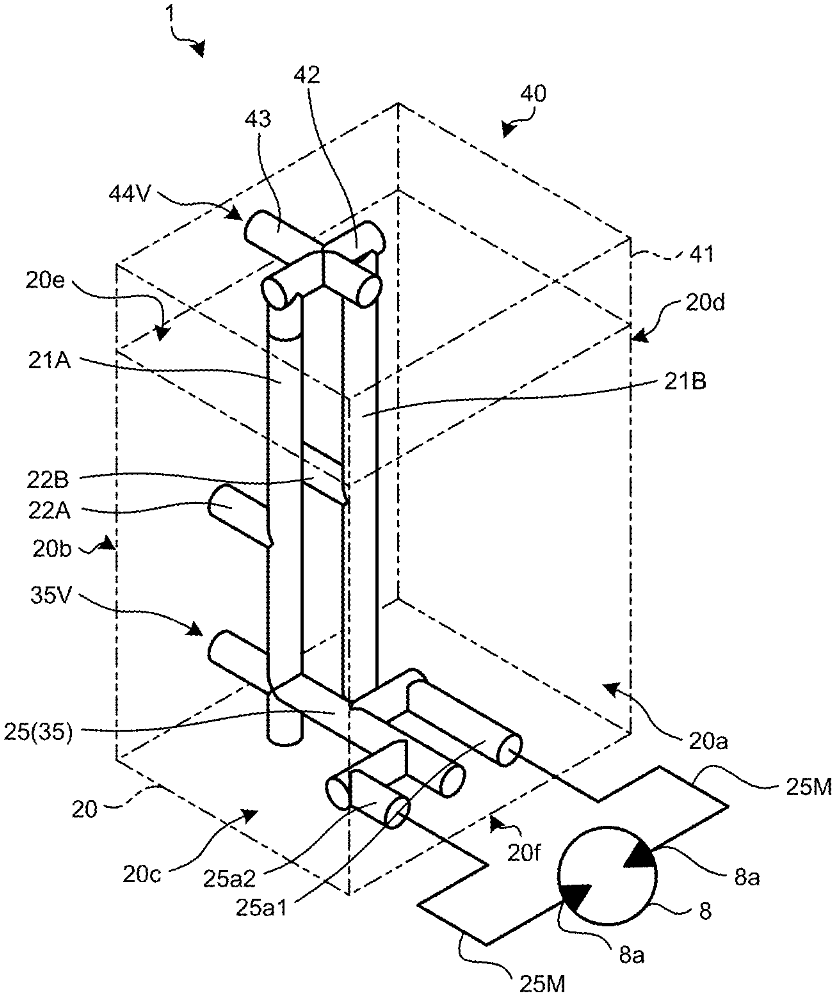
FIG. 5A is a perspective view corresponding to FIG. 1, illustrating only a configuration of a swing spool in the hydraulic valve apparatus illustrating in FIG. 1.
Figure 5B:
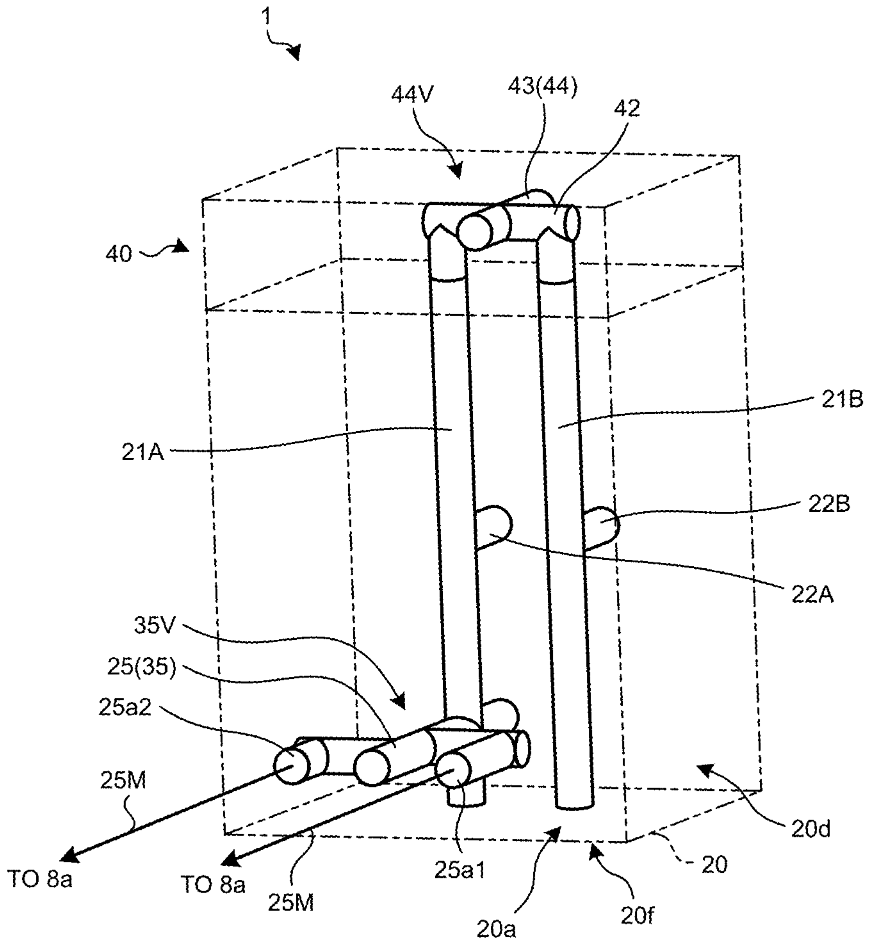
FIG. 5B is a perspective view corresponding to FIG. 2, illustrating only the configuration of the swing spool in the hydraulic valve apparatus illustrating in FIG. 1.
Figure 6A:
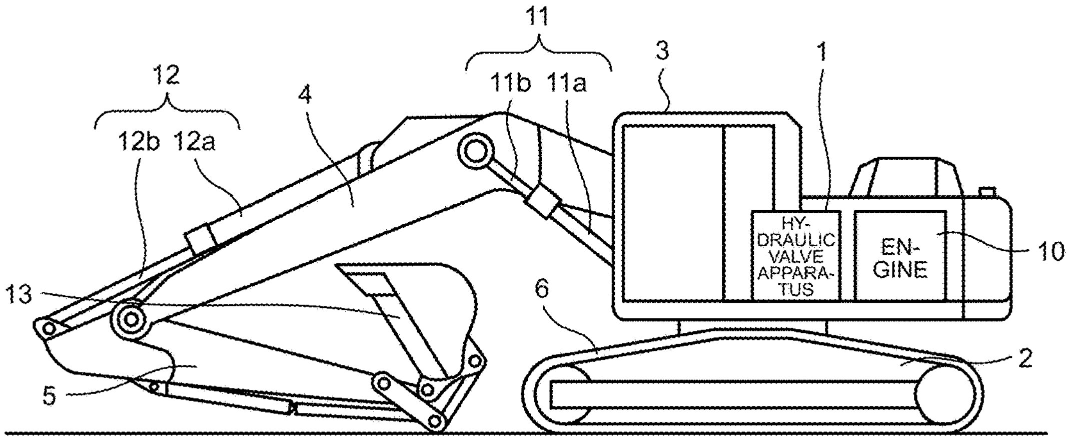
FIG. 6A is a side view illustrating a work machine to which the hydraulic valve apparatus illustrated in FIG. 1 is applied.
Figure 6B:
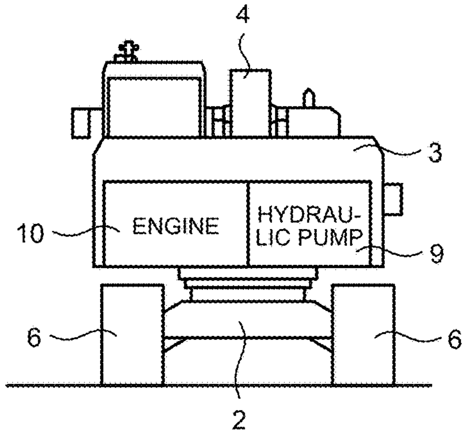
FIG. 6B is a rear view illustrating the work machine to which the hydraulic valve apparatus illustrated in FIG. 1 is applied.
Figure 6C:
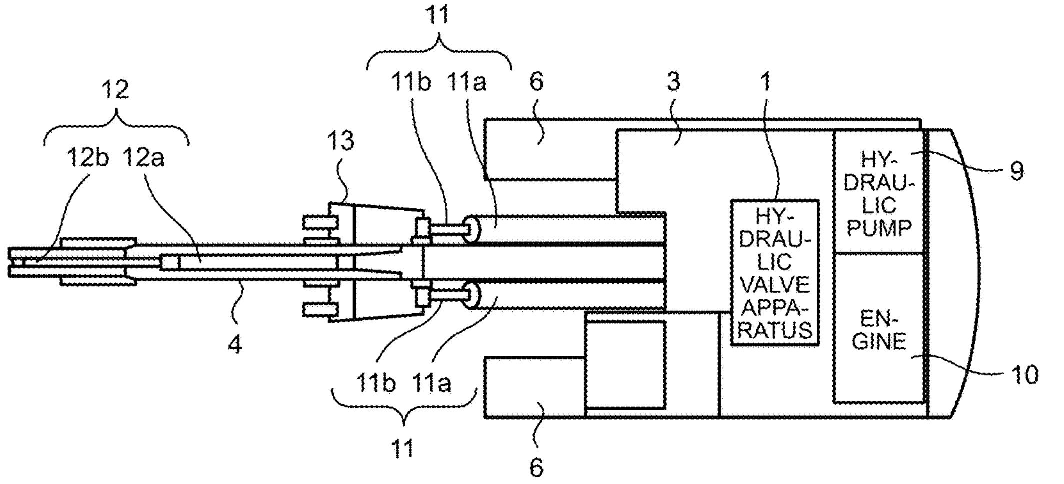
FIG. 6C is a plan view illustrating the work machine to which the hydraulic valve apparatus illustrated in FIG. 1 is applied.
Figure 7:
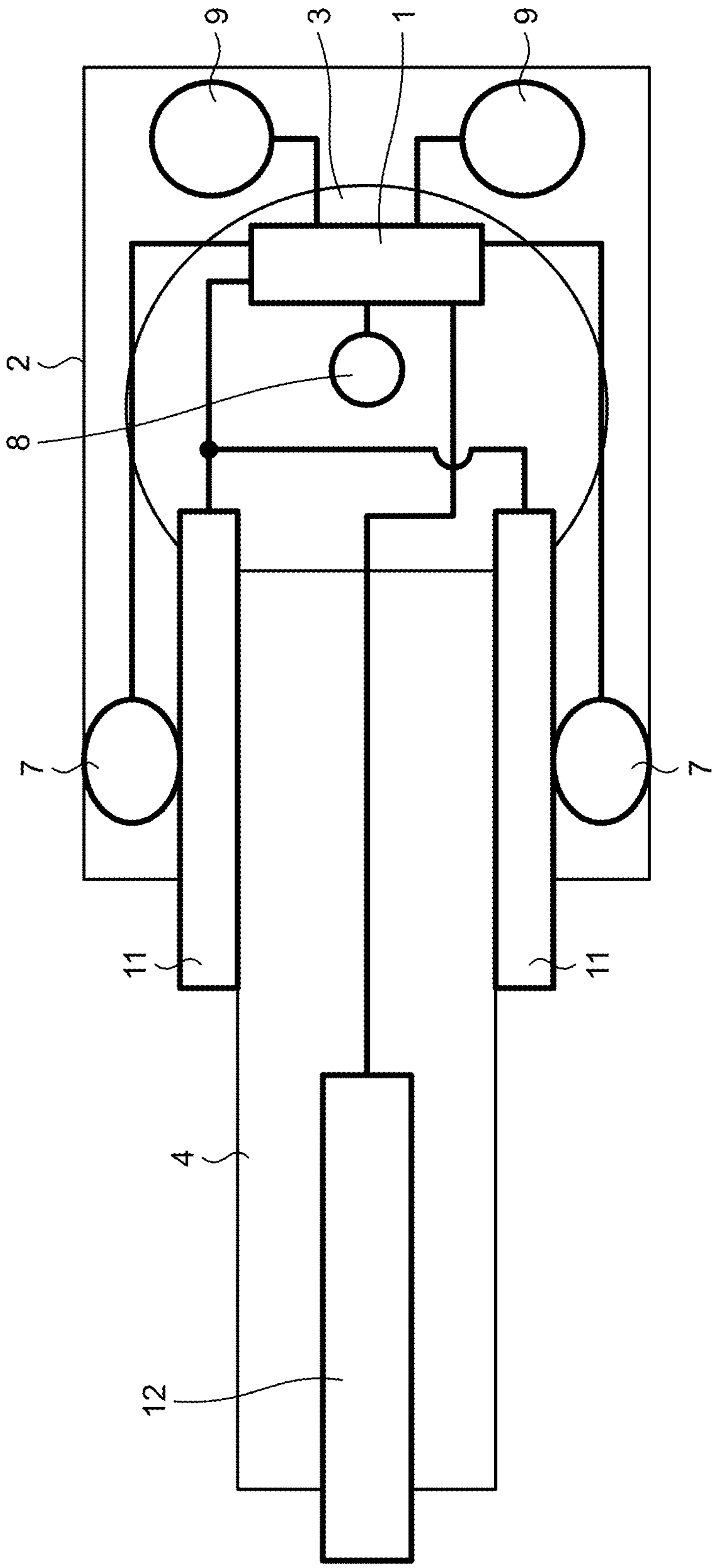
FIG. 7 is a plan view schematically illustrating a hydraulic circuit of the work machine to which the hydraulic valve apparatus illustrated in FIG. 1 is applied.
Figure 8:
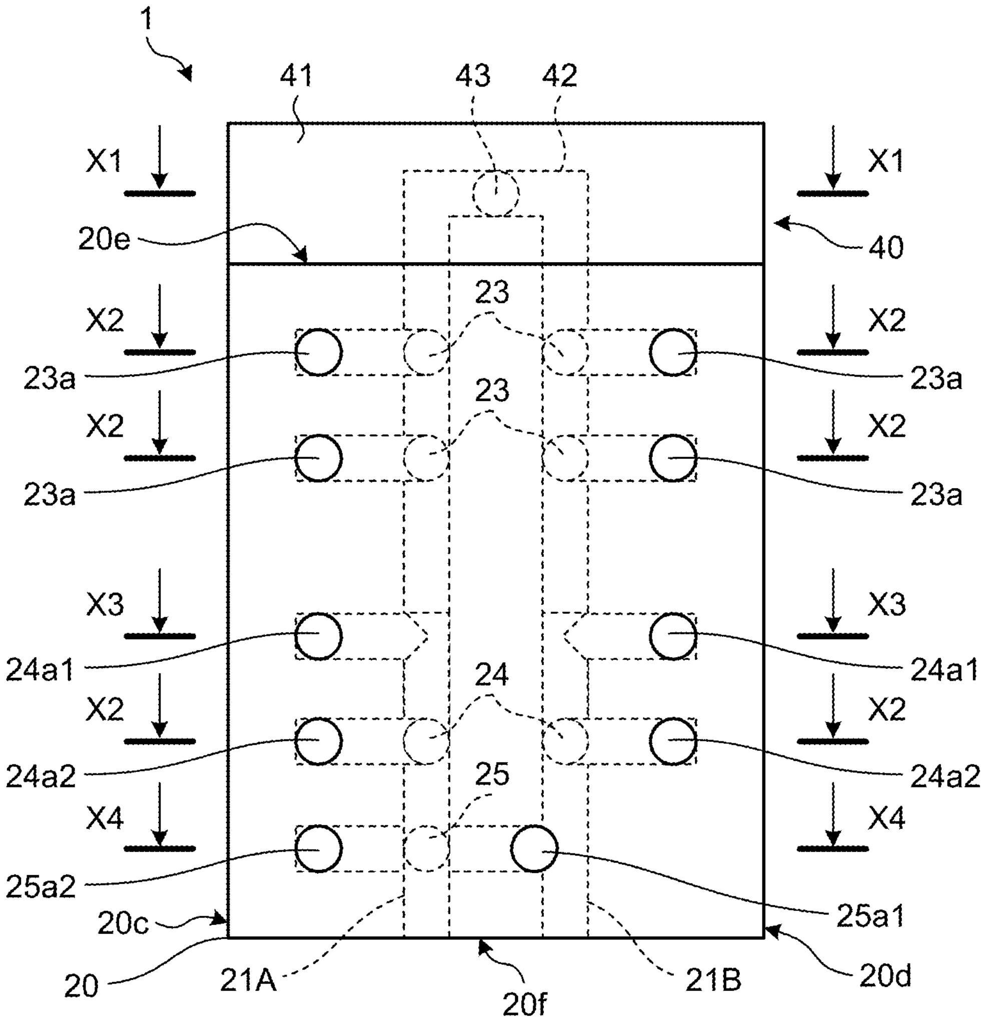
FIG. 8 is a front view of the hydraulic valve apparatus illustrated in FIG. 1 as viewed from the front.
Figure 9:
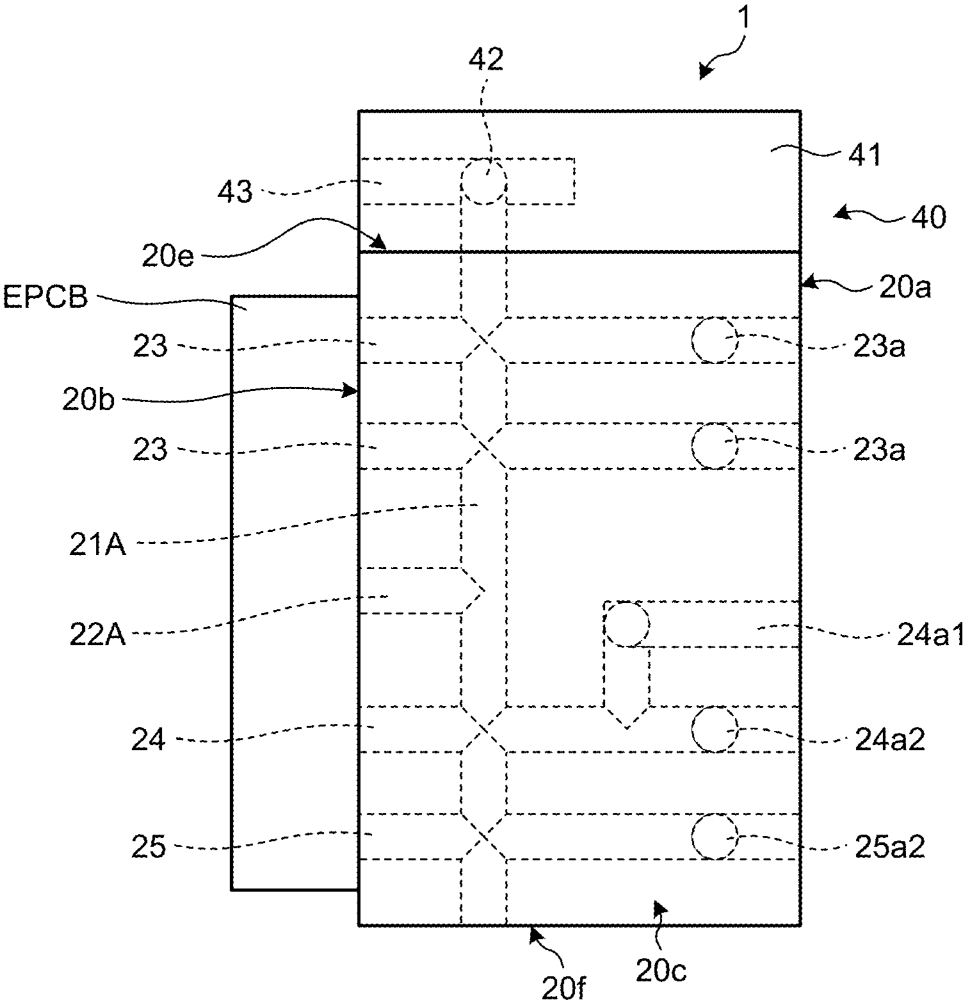
FIG. 9 is a left side view of FIG. 8.
Figure 10:
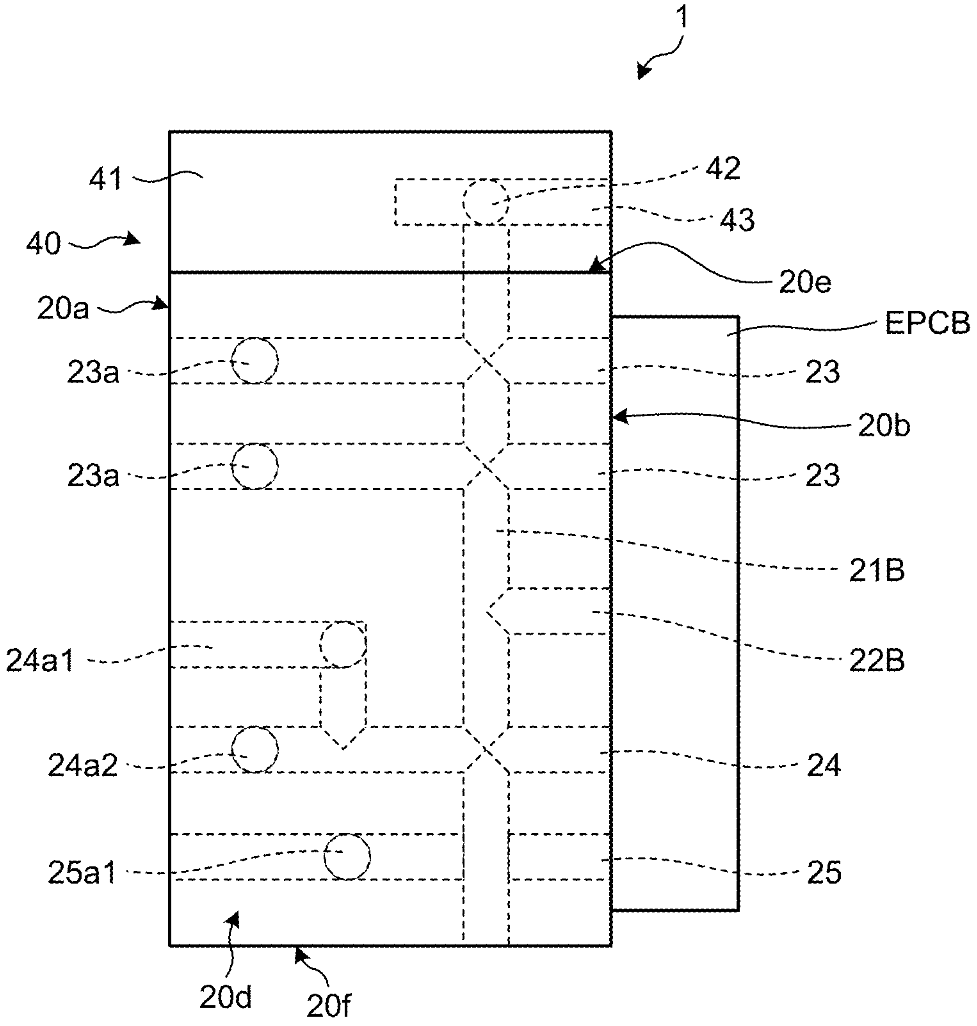
FIG. 10 is a right-side view of FIG. 8.
Figure 11:
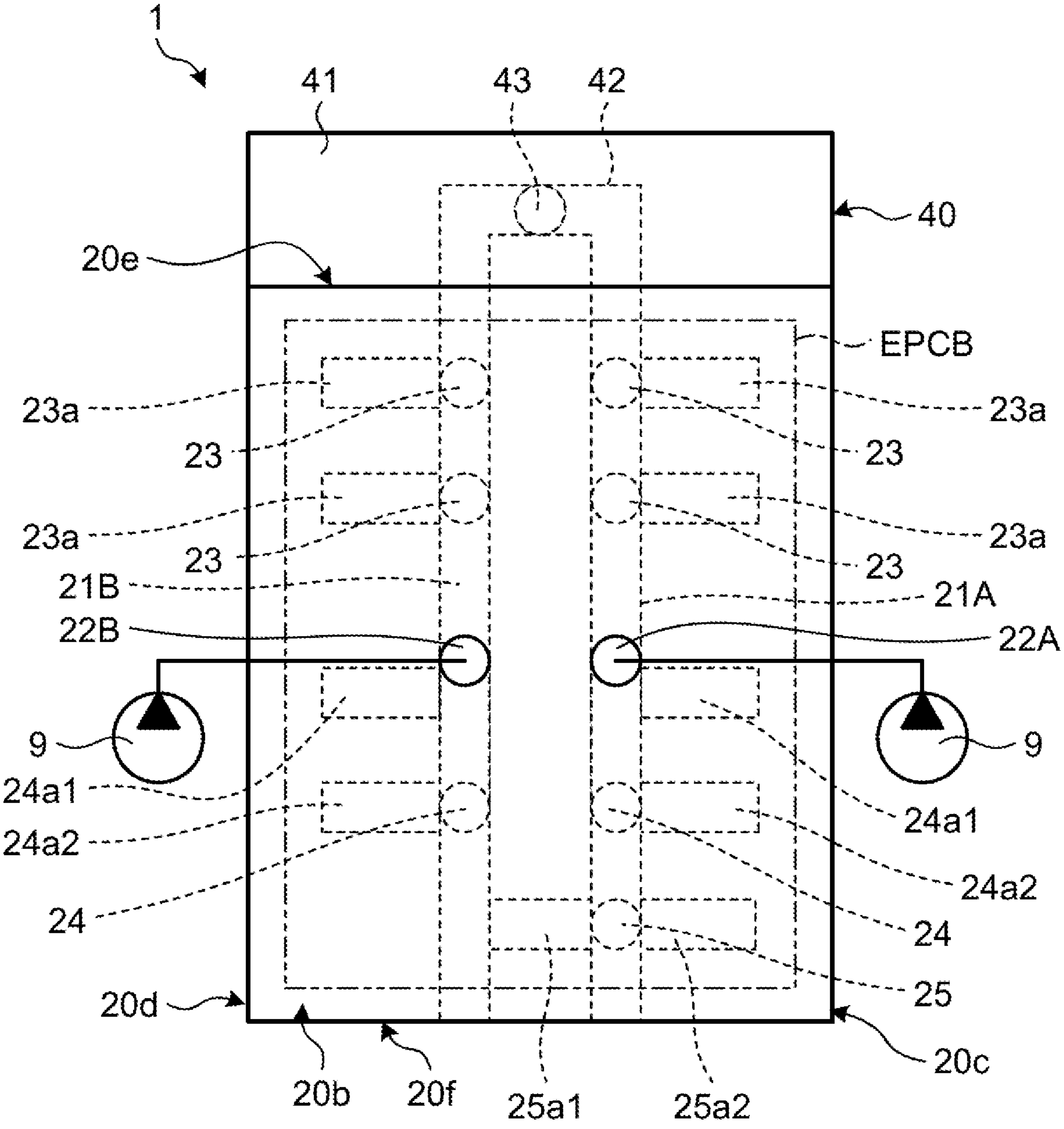
FIG. 11 is a rear view of FIG. 8.
Figure 12:
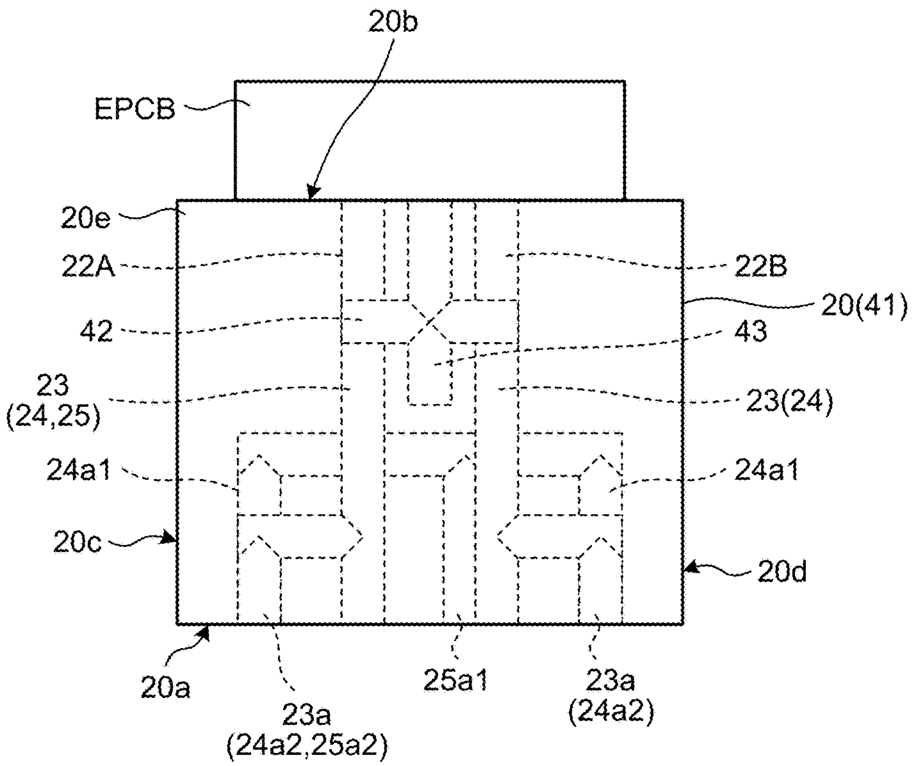
FIG. 12 is a plan view of FIG. 8.
Figure 13:
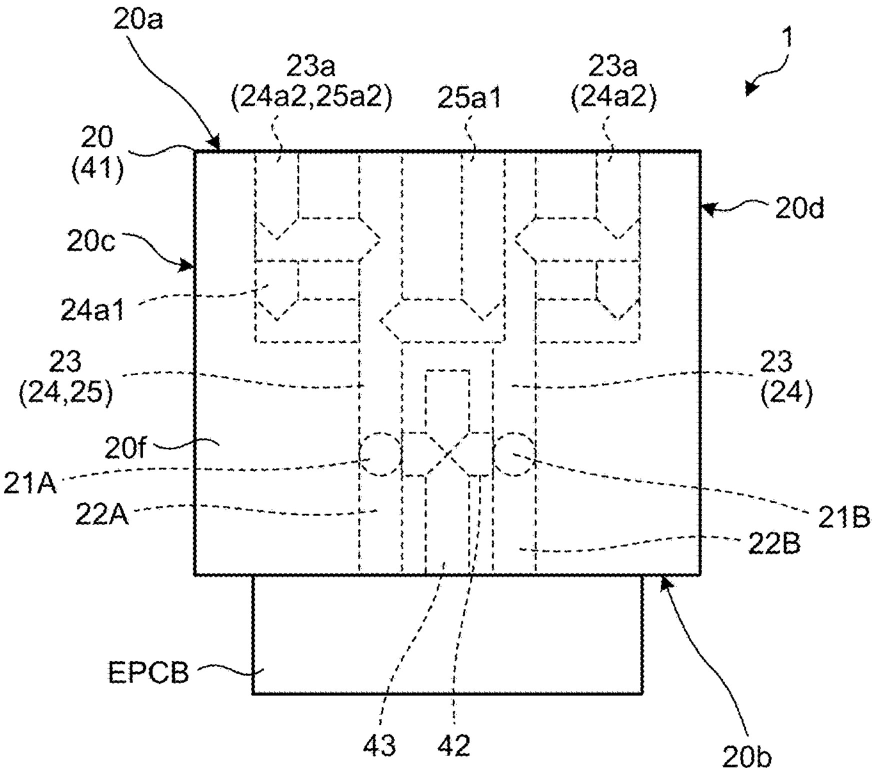
FIG. 13 is a bottom view of FIG. 8.
Figure 14:
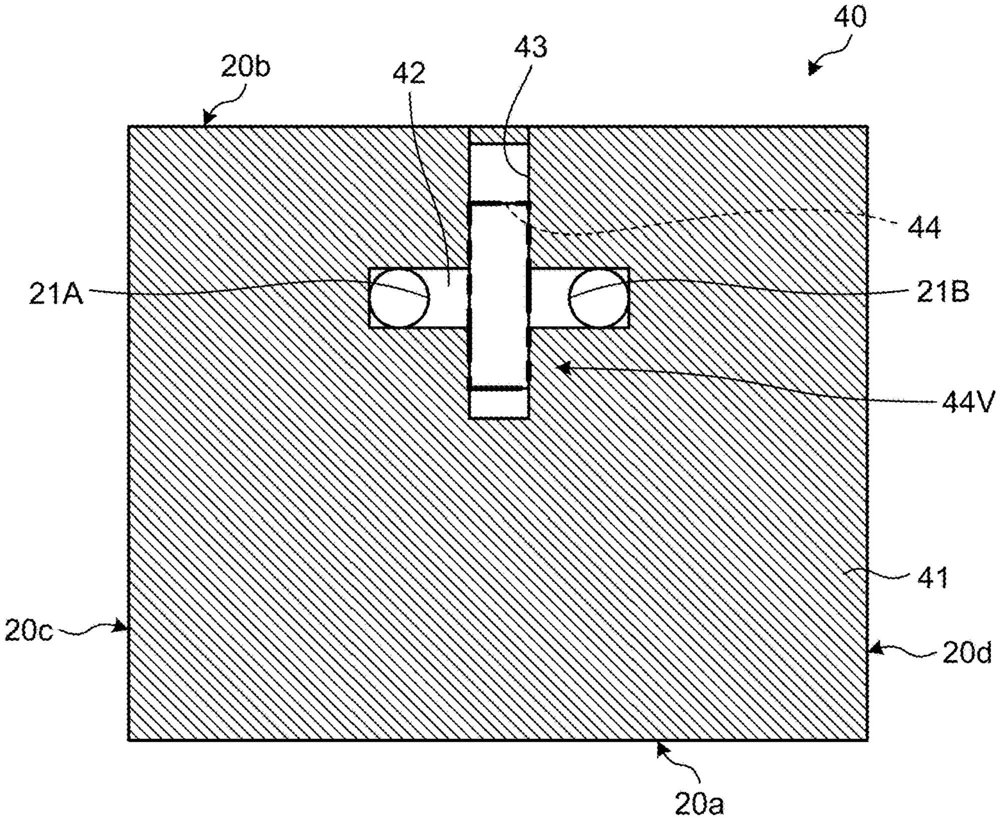
FIG. 14 is a cross-sectional view taken along a line X1-X1 in FIG. 8.
Figure 15:
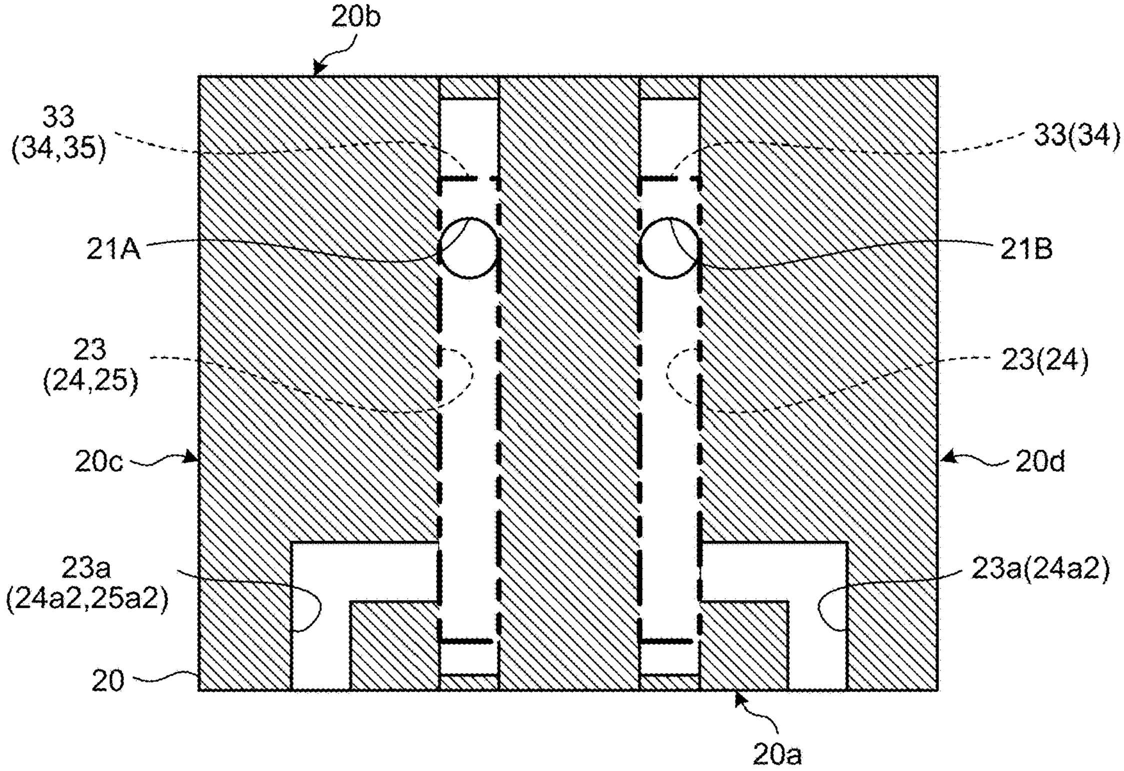
FIG. 15 is a cross-sectional view taken along a line X2-X2 in FIG. 8.
Figure 16:
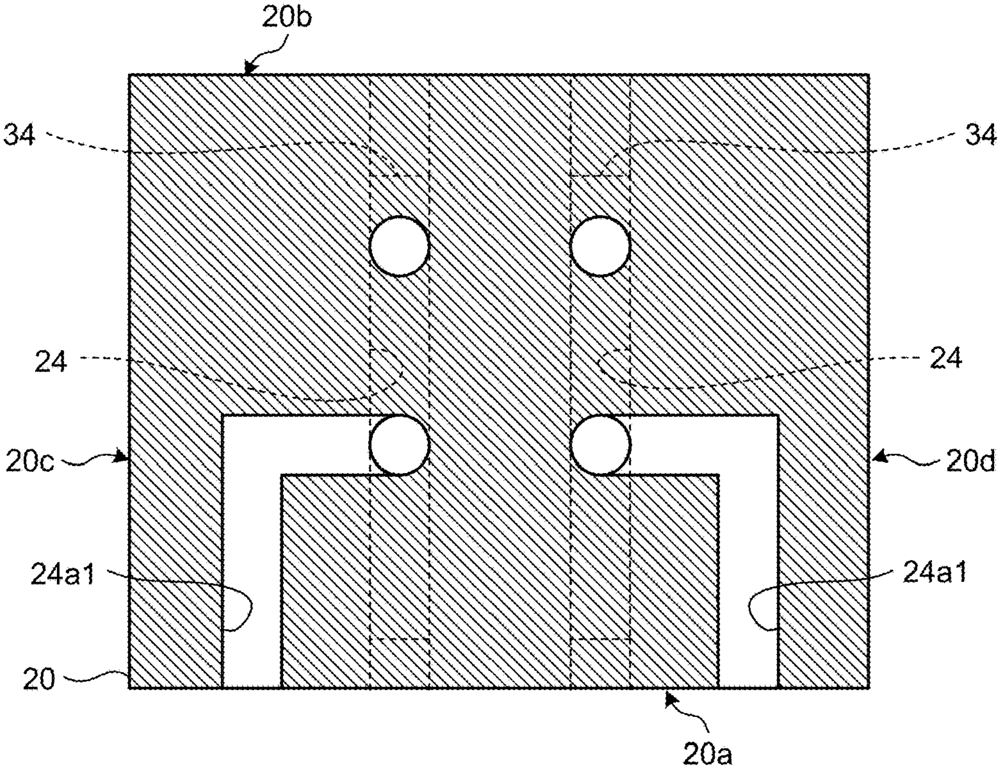
FIG. 16 is a cross-sectional view taken along a line X3-X3 in FIG. 8.
Figure 17:
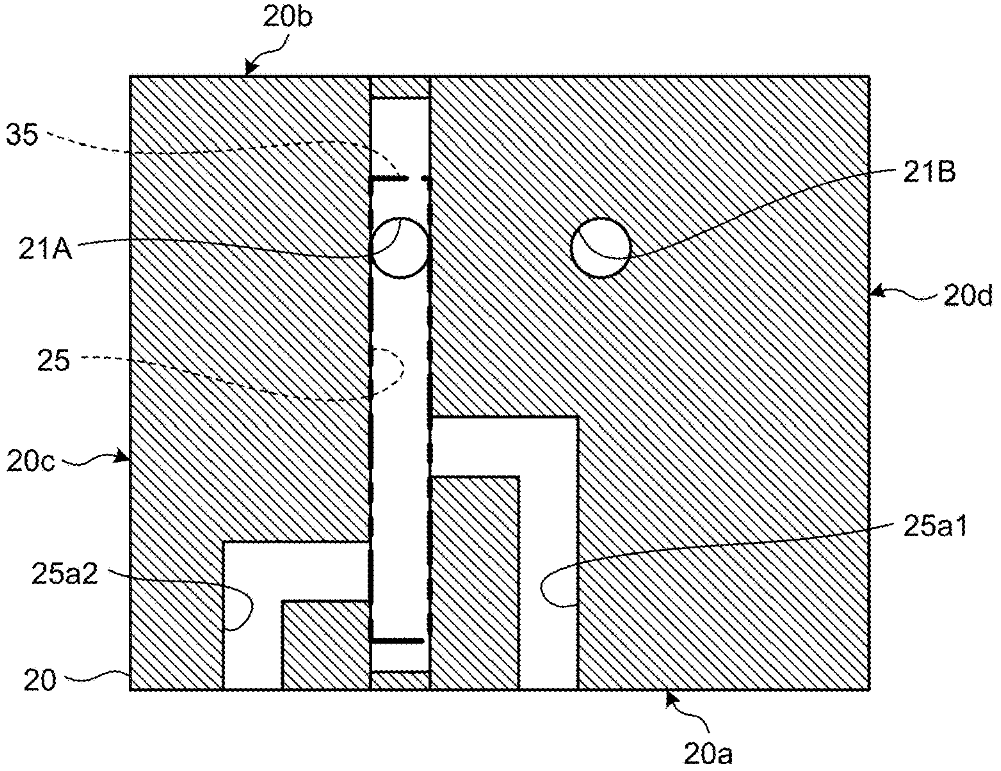
FIG. 17 is a cross-sectional view taken along a line X4-X4 in FIG. 8.

Hereinafter, a preferred embodiment of a hydraulic valve apparatus according to the present disclosure will be described in detail with reference to the accompanying drawings.

FIGS. 1 to 5B conceptually illustrate a hydraulic valve apparatus according to the embodiment of the present disclosure. As illustrated in FIGS. 6A, 6B, 6C, and 7, a hydraulic valve apparatus 1 exemplified herein is applied to a work machine including an upper swing body 3, a boom 4, and an arm 5 in an upper portion of a lower traveling body 2. The lower traveling body 2 includes crawler belts 6 on both sides and traveling hydraulic motors (rotary hydraulic device) 7 separately corresponding to respective crawler belt 6, and can travel by driving the crawler belts 6 via the traveling hydraulic motors 7. The upper swing body 3 is rotatably supported around a swing axis along a vertical direction with respect to the lower traveling body 2. A swing hydraulic motor (rotary hydraulic device) 8 is provided between the lower traveling body 2 and the upper swing body 3 so that the upper swing body 3 can be swung with respect to the lower traveling body 2. The traveling hydraulic motor 7 and the swing hydraulic motor 8 each include two supply ports 7*a* and 8*a*, and can rotate in both forward and reverse directions by changing an oil supply direction. A hydraulic pump 9 is mounted on the upper swing body 3. The hydraulic pump 9 is driven by an engine 10, and two hydraulic pumps 9 having the same maximum discharge flow rate are prepared in the upper swing body 3. In the illustrated example, the engine 10 is mounted on the left side in the rear portion of the upper swing body 3, and the two hydraulic pumps 9 are mounted on the right side in the rear portion of the upper swing body 3 while being adjacent to the engine 10. The boom 4 is rotatably supported by the upper swing body 3 via a base end portion by a support shaft along a horizontal direction. The arm 5 is rotatably supported at a distal end portion of the boom 4 via a base end portion thereof by a horizontal support shaft. A boom hydraulic cylinder (linear motion hydraulic device) 11 is provided between the upper swing body 3 and the boom 4, and an arm hydraulic cylinder (linear motion hydraulic device) 12 is provided between the boom 4 and the arm 5. Each of the boom hydraulic cylinder 11 and the arm hydraulic cylinder 12 is a single-rod double-acting type including a single piston rod. The boom hydraulic cylinder 11 is supported by the upper swing body 3 via a cylinder body 11*a*, and is supported by the boom 4 via a piston rod 11*b*. The arm hydraulic cylinder 12 is supported by the boom 4 via a cylinder body 12*a*, and is supported by the arm 5 via a piston rod 12*b*.

The hydraulic valve apparatus 1 is interposed between the traveling hydraulic motor 7, the swing hydraulic motor 8, the boom hydraulic cylinder 11, and the arm hydraulic cylinder 12 described above (hereinafter, the devices may be collectively referred to as hydraulic devices) and the hydraulic pump 9, controls the supply of oil from the hydraulic pump 9 to the hydraulic devices 7, 8, 11, and 12, and includes a valve body 20 as illustrated in FIG. 1. The valve body 20 is formed in a rectangular parallelepiped shape that is vertically long along the vertical direction in FIG. 1. In the following description, for convenience, in FIG. 1, a surface located obliquely on the right front of the valve body 20 is referred to as a front surface 20*a*, a surface parallel to the front surface 20*a* is referred to as a rear surface 20*b*, and two surfaces located on both sides are referred to as side surfaces 20*c* and 20*d*. In addition, in FIG. 1, a surface located upward is referred to as an upper surface 20*e*, and a surface located downward is referred to as a lower surface 20*f*.

As illustrated in FIGS. 1 to 5B and FIGS. 8 to 17, two pump oil passages 21A and 21B are provided in the valve body 20. The pump oil passages 21A and 21B extend linearly along the vertical direction of the valve body 20, respectively, and are formed to have the same inner diameter with each other. In the illustrated example, the two pump oil passages 21A and 21B are arranged side by side at symmetrical positions while being parallel to each other in a portion biased toward the rear surface 20*b* side. Although not clearly illustrated in the drawing, lower ends of the two pump oil passages 21A and 21B are both closed. When closing the lower ends of the pump oil passages 21A and 21B, a plug may be attached after the oil passage is once formed. Upper ends of the two pump oil passages 21A and 21B are opened to the upper surface 20*e* of the valve body 20. In the present embodiment, the pump oil passages 21A and 21B are connected to the individual hydraulic pumps 9 via pump ports 22A and 22B, respectively. The pump ports 22A and 22B linearly extend rearward from the pump oil passages 21A and 21B, and open on the rear surface 20*b* of the valve body 20. Although not clearly illustrated in the drawing, distances from the pump ports 22A and 22B to the hydraulic pump 9 are equal to each other.

In each of the pump oil passages 21A and 21B, two cylinder spool holes 23 are provided in each of the upper and lower sides at a portion located above a connection portion with the pump ports 22A and 22B. Further, each of the pump oil passages 21A and 21B is provided with a traveling spool hole 24 at a portion located below the connection portion with the pump ports 22A and 22B. Furthermore, in the pump oil passage 21A disposed on the left side when viewed from the front surface 20*a* of the valve body 20, one swing spool hole 25 is provided in a portion located below the traveling spool hole 24. The cylinder spool hole 23, the traveling spool hole 24, and the swing spool hole 25 linearly extend along the front-rear direction of the valve body 20, and communicate with the pump oil passages 21A and 21B by penetrating the corresponding pump oil passages 21A and 21B. Both ends of each of the spool holes 23, 24, and 25 are closed.

The cylinder spool hole 23 is provided with a cylinder port 23*a* at a portion close to the front surface 20*a* side of the valve body 20. The cylinder port 23*a* extends from a side portion facing the side surfaces 20*c* and 20*d* of the valve body 20 in each cylinder spool hole 23 toward the side surfaces 20*c* and 20*d*, respectively, bends toward the front surface 20*a* side, and is opened to the front surface 20*a* of the valve body 20. A boom rod oil passage 11Ha communicating with a rod chamber 11H of the boom hydraulic cylinder 11 is connected to the cylinder port 23*a* that opens to the upper right when viewed from the front surface 20*a* of the valve body 20. A boom bottom oil passage 11Ha that communicates with a bottom chamber 11B of the boom hydraulic cylinder 11 is connected to the cylinder port 23*a* that opens to the lower right when viewed from the front surface 20*a* of the valve body 20. Similarly, an arm bottom oil passage 12Ba that communicates with a bottom chamber 12B of the arm hydraulic cylinder 12 is connected to the cylinder port 23*a* that opens to the upper left when viewed from the front surface 20*a* of the valve body 20. An arm rod oil passage 12Ha that communicates with a rod chamber 12H of the arm hydraulic cylinder 12 is connected to the cylinder port 23*a* that opens to the lower left when viewed from the front surface 20*a* of the valve body 20.

The traveling spool hole 24 is provided with traveling motor ports **24*a*1 and 24*a*2 midway and at a portion adjacent to the front surface 20*a* side of the valve body 20, respectively. The traveling motor port 24*a*1 provided midway of the traveling spool hole 24 extends from an upper part facing the upper surface 20*e* of the valve body 20 toward the upper surface 20*e*, bends toward the front surface 20*a* side, and opens to the front surface 20*a* of the valve body 20. The traveling motor port 24*a*2 provided in a portion adjacent to the front surface 20*a* of the valve body 20 extends from lateral portions facing the side surfaces 20*c* and 20*d* of the valve body 20 toward the side surfaces 20*c* and 20*d*, bends toward the front surface 20*a* side, and opens to the front surface 20*a* of the valve body 20. The two traveling motor ports 24*a*1 and 24*a*2 that open to the left when viewed from the front surface 20*a* of the valve body 20 are connected to traveling hydraulic motor oil passages 24MA1 and 24MA2 that communicate with the supply port 7*a* of the traveling hydraulic motor 7 disposed on the right side of the lower traveling body 2**, respectively.

The two traveling motor ports **24*a*1 and 24*a*2 that open to the right when viewed from the front surface 20*a* of the valve body 20 are connected to traveling hydraulic motor oil passages 24MB1 and 24MB2 that communicate with the supply port 7*a* of the traveling hydraulic motor 7 disposed on the left side of the lower traveling body 2, respectively. The left and right sides of each of the traveling hydraulic motors 7 have the same oil supply condition. That is, a passage length of the traveling hydraulic motor oil passages 24MA1+24MA2 connected to one traveling hydraulic motor 7 is equal to a passage length of the traveling hydraulic motor oil passages 24MB1+24MB2 connected to the other traveling hydraulic motor 7, and the inner diameters of the traveling hydraulic motor oil passages 24MA1, 24MA2, 24MB1, and 24MB2** are also equal to each other.

The swing spool hole 25 is provided with swing motor ports **25*a*1 and 25*a*2 midway and at a portion adjacent to the front surface 20*a* side of the valve body 20, respectively. The swing motor port 25*a*1 provided midway of the swing spool hole 25 extends from a lateral portion facing the right-side surface 20*d* when viewed from the front surface 20*a* of the valve body 20 toward the side surface 20*d*, bends toward the front surface 20*a* side, and opens to the front surface 20*a* of the valve body 20. The swing motor port 25*a*2 provided in a portion adjacent to the front surface 20*a* of the valve body 20 extends from a lateral portion facing the left side surface 20*c* when viewed from the front surface 20*a* of the valve body 20 toward the side surface 20*c*, bends toward the front surface 20*a* side of the valve body 20, and opens to the front surface 20*a* of the valve body 20. The two swing motor ports 25*a*1 and 25*a*2 are respectively connected to a swing hydraulic motor oil passage 25M communicating with the supply port 8*a* of the swing hydraulic motor 8**.

Spools are separately disposed in the cylinder spool hole 23, the traveling spool hole 24, and the swing spool hole 25 described above. Although not illustrated in the drawings, the spool moves along an axial direction when a pilot pressure is applied from an individual EPC valve (electromagnetic proportional control valve). More specifically, a cylinder spool (linear motion spool) 33 disposed in the cylinder spool hole 23 moves along the axial direction to switch an intermittent state between the pump oil passages 21A and 21B and the cylinder port **23*a*, and configures a cylinder direction switching valve 33V with cylinder spool hole 23. Similarly, a traveling spool (rotation spool) 34 disposed in the traveling spool hole 24 moves along the axial direction to switch an intermittent state between the pump oil passages 21A and 21B and the traveling motor ports 24*a*1 and 24*a*2, and configures a traveling direction switching valve 34V with the traveling spool hole 24. A swing spool (rotation spool) 35 disposed in the swing spool hole 25 moves along the axial direction to switch an intermittent state between the pump oil passage 21A and the swing motor ports 25*a*1 and 25*a*2, and configures a swing direction switching valve 35V with the swing spool hole 25. Although not clearly illustrated in the drawing, the plurality of EPC valves corresponding to the spools 33, 34, and 35, respectively, are housed in a housing box EPCB provided on the rear surface 20*b* of the valve body 20**.

A unit block 41 of a merging-separating switching unit 40 is disposed on the upper surface **20*e* of the valve body 20. The unit block 41 has a size capable of simultaneously covering the openings of the two pump oil passages 21A and 21B opened in the upper surface 20*e* of the valve body 20, and includes a merging-separating oil passage 42 and a valve spool hole 43 therein. The merging-separating oil passage 42 extends in the left-right direction inside the unit block 41, and then each end portion thereof is bent downward and opened to a lower surface of the unit block 41. The merging-separating oil passage 42 is connected to upper ends of the pump oil passages 21A and 21B via lower end openings. The valve spool hole 43 linearly extends along the front-rear direction, and communicates with the merging-separating oil passage 42 by penetrating midway of a portion extending in the left-right direction in the merging-separating oil passage 42. Both end portions of the valve spool hole 43 are closed. A merging-separating spool 44 is disposed in the valve spool hole 43. When the pilot pressure is applied from the EPC valve, the merging-separating spool 44 moves along the axial direction to switch an intermittent state of the merging-separating oil passage 42, and configures a merging-separating switching valve 44V with the valve spool hole 43**.

The hydraulic valve apparatus 1 described above is mounted at a position in front of the engine 10 and substantially at the center in the left-right direction in the upper swing body 3 while the front surface **20*a* of the valve body 20 faces the front of the work machine and the upper surface 20*e* is upward. In the work machine including the hydraulic valve apparatus 1, when an operation lever (not illustrated) is operated, the corresponding spools 33, 34, 35, and 44 appropriately operate via the EPC valve, and the supply state of oil from the hydraulic pump 9 to the hydraulic devices 7, 8, 11, and 12 is changed. For example, when the pump oil passage 21B and the cylinder port 23*a* communicate with each other by the operation of the cylinder spool 33 disposed in the upper right portion as viewed from the front surface 20*a* of the valve body 20, oil from the hydraulic pump 9 is supplied to the rod chamber 11H of the boom hydraulic cylinder 11 via the pump oil passage 21B, the cylinder port 23*a*, and the boom rod oil passage 11Ha. As a result, the boom hydraulic cylinder 11 is retracted, and it is possible to cause the work machine to perform an operation of moving a distal end of the boom 4 downward. Similarly, when the pump oil passage 21A and the cylinder port 23*a* communicate with each other by the operation of the cylinder spool 33 disposed in the upper left portion as viewed from the front surface 20*a* of the valve body 20, oil from the hydraulic pump 9 is supplied to the bottom chamber 12B of the arm hydraulic cylinder 12 via the pump oil passage 21A, the cylinder port 23*a*, and the arm bottom oil passage 12Ba. As a result, the arm hydraulic cylinder 12 is extended, making it possible to perform an operation for pulling a distal end of the arm 5 toward the upper swing body 3** with respect to the working equipment.

Here, while the merging-separating oil passage 42 is blocked by the merging-separating spool 44, oil is supplied to the hydraulic cylinders 11 and 12 through one of the pump oil passages 21A and 21B. On the other hand, when the merging-separating oil passage 42 is brought into a communicating state by the merging-separating spool 44, oil supplied from one hydraulic pump 9 to one pump oil passage 21A and oil supplied from the other hydraulic pump 9 to the other pump oil passage 21B in the valve body 20 can be merged. As a result, oil can also be supplied from the other pump oil passage 21B to the cylinder port 23*a* connected to the one pump oil passage 21A, and the operations of the hydraulic cylinders 11 and 12 can be sped up. Moreover, according to the hydraulic valve apparatus 1 described above, the merging-separating switching valve 44V configured by the merging-separating spool 44 is provided in the merging-separating oil passage 42 connecting the upper end portion of each of the pump oil passages 21A and 21B, and the cylinder spool 33 is connected to a portion of each of the pump oil passages 21A and 21B located above connection portions with the pump ports 22A and 22B.

Therefore, oil that passed through the merging-separating switching valve 44V does not pass through the traveling spool 34 or the swing spool 35 disposed below the connection portion with the pump ports 22A and 22B before reaching the target cylinder spool 33. Furthermore, since oil that passed through the merging-separating switching valve 44V does not merge with oil supplied from the other hydraulic pump 9 before reaching the target cylinder spool 33, it is possible to prevent pressure loss in the oil passage. As a result, more oil can be efficiently supplied to the target cylinder spool 33 while pressure loss is minimized.

On the other hand, when the operation lever is operated to supply oil to the traveling hydraulic motor 7, the work machine can travel via the crawler belt 6, and when oil is supplied to the swing hydraulic motor 8, the upper swing body 3 can be swung with respect to the lower traveling body 2. According to the above-mentioned hydraulic valve apparatus 1, each of the pump oil passages 21A and 21B is provided with the traveling spool 34 at a portion located below the connection portion with the pump ports 22A and 22B. The passages of oil from the pump ports 22A and 22B to each traveling spool 34 are the same. In addition, the traveling spool 34 is first connected to any portion located below the pump ports 22A and 22B, and the other spools 33 and 35 are not interposed. That is, according to the hydraulic valve apparatus 1 described above, no problem is caused by the difference in the passage length of oil with respect to the two traveling spools 34, and no problem is caused by a difference in pressure loss. As a result, by operating the operation lever for straight travel, supply pressure and supply flow rate of oil to the two traveling spools 34 can be made equal, making it possible to improve the straightness of the work machine to which the disclosure is applied.

In the embodiment described above, four cylinder spools 33 provided corresponding to the boom 4 and the arm 5 of the work machine are exemplified as linear motion spools, a linear motion spool provided corresponding to other linear motion hydraulic devices (hydraulic cylinders) may be provided to configure the hydraulic valve apparatus. For example, in the work machine described above, a hydraulic valve apparatus provided with a bucket spool corresponding to a bucket hydraulic cylinder for operating a bucket 13 provided at a distal end portion of the arm 5 may be configured.

Further, in the above-described embodiment, the rotation spools 34 and 35 are provided corresponding to the hydraulic motors 7 and 8 which are rotary hydraulic devices, but the rotation spools 34 and 35 are not necessarily provided.

REFERENCE SIGNS LIST

1 HYDRAULIC VALVE APPARATUS
7 TRAVELING HYDRAULIC MOTOR
8 SWING HYDRAULIC MOTOR
9 HYDRAULIC PUMP
11 BOOM HYDRAULIC CYLINDER
12 ARM HYDRAULIC CYLINDER
20 VALVE BODY
21A, 21B PUMP OIL PASSAGE
22A, 22B PUMP PORT
16
33 CYLINDER SPOOL
34 TRAVELING SPOOL
35 SWING SPOOL
42 MERGING-SEPARATING OIL PASSAGE
44V MERGING-SEPARATING SWITCHING VALVE

The invention claimed is:

1. A hydraulic valve apparatus that is interposed between a hydraulic device and a hydraulic pump and controls supply of oil from the hydraulic pump to the hydraulic device by operating a spool provided in a valve body, wherein
- the valve body includes,
- two pump oil passages connected to separate hydraulic pumps via pump ports, and
- a plurality of linear motion spools separately provided corresponding to a plurality of linear motion hydraulic devices,
- the two pump oil passages are provided in the valve body to be arranged side by side along a same direction,
- the plurality of linear motion spools are connected to a portion located on one side of the pump ports in the pump oil passages, and
- the two pump oil passages are connected to each other via a merging-separating oil passage including a merging-separating switching valve at an end portion located on one side of the pump ports.

2. The hydraulic valve apparatus according to claim 1, wherein
- the valve body includes rotation spools corresponding to rotary hydraulic devices,
- the pump ports are provided midway of the respective pump oil passages, and
- the rotation spools are connected to a portion located on another side of the pump ports in the pump oil passages.

3. The hydraulic valve apparatus according to claim 2, wherein the rotation spools control supply of oil to a traveling hydraulic motor, two of the rotation spools are provided in the valve body, and the rotation spools are connected to separate pump oil passages without passing through other spools at positions at which distances from the pump ports are equal to each other.

4. A hydraulic valve apparatus that is interposed between a hydraulic device and a hydraulic pump and controls supply of oil from the hydraulic pump to the hydraulic device by operating a spool provided in a valve body, wherein
- the valve body includes, two pump oil passages connected to separate hydraulic pumps via pump ports, a plurality of linear motion spools separately provided corresponding to a plurality of linear motion hydraulic devices, and rotation spools corresponding to rotary hydraulic devices, the two pump oil passages are provided in the valve body to be arranged side by side along a same direction, the pump ports are provided midway of each of the pump oil passages, the plurality of linear motion spools are connected to a portion located on one side of the pump ports in the pump oil passages, the rotation spools are connected to a portion located on another side of the pump ports in the pump oil passages, and the two pump oil passages are connected to each other via a merging-separating oil passage including a merging-separating switching valve at one end portion to which the plurality of linear motion spools are connected.

* * * * *